United States Patent [19]

John, Jr.

[11] 4,320,394
[45] Mar. 16, 1982

[54] FIBER OPTICS LIQUID LEVEL AND FLOW SENSOR SYSTEM

[75] Inventor: Robert S. John, Jr., Deerfield, Ill.

[73] Assignee: International Telephone and Telegraph Corporation, New York, N.Y.

[21] Appl. No.: 98,957

[22] Filed: Nov. 30, 1979

[51] Int. Cl.$^3$ .............................................. G08B 21/00
[52] U.S. Cl. .................................. 340/618; 340/380; 340/624; 250/206; 200/84 C
[58] Field of Search ............... 340/618, 619, 623, 624, 340/380; 200/84 C; 250/200, 201, 206, 227

[56] References Cited

U.S. PATENT DOCUMENTS 4,038,650 7/1977 Evans et al. ......................... 340/380
4,066,858 1/1978 Piper et al. ......................... 200/84 C

*Primary Examiner*—Alvin H. Waring
*Attorney, Agent, or Firm*—James B. Raden; William J. Michals

[57] ABSTRACT

A fiber optics level sensor (FOLS) or flow sensor (FOFS) system for use in hazardous environments, process control, and industrial and environmental control applications. The system includes a pair of fiber optic bundles arranged between a remote sensor and a control module. The remote sensor detects the position of a movable vane—which is mechanically coupled to a float in the sensed environment—by means of a transmission gap between confronting ends of the pair of fiber optic bundles. The control module includes a light output device driven by an oscillator which thereby generates pulses of light which are optically coupled to the end of one of the bundles. The end of the other bundle is coupled to a photodetector which generates electrical pulses in response to the returning light pulses. The electrical pulses are amplified and then gated through a sampling circuit which is internally synchronized by means of and in resonse to the oscillator. The gated electrical pulses are then coupled to a staircase generator the output of which is coupled to a comparator. When the output of the staircase generator falls below a predetermined level the output of the comparator changes state to provide an indication that the vane has interrupted the light path in the gap. The output of the comparator controls a relay which is coupled to an external utilization device such as an alarm or a valve control.

3 Claims, 3 Drawing Figures

FIBER OPTICS LIQUID LEVEL AND FLOW SENSOR SYSTEM

BACKGROUND OF THE INVENTION

This invention relates to fiber optics level sensor and flow sensor systems and, more particularly to such systems which incorporate a passive, non-electrical sensor head remotely disposed in the sensed environment.

Level and flow sensors which sense the level or flow of a liquid in a vessel, such as a fuel tank, are known and have been widely used in the art. An example of one such level sensor is the vertical float switch disclosed in U.S. Pat. No. 4,066,858, which is assigned to the same assignee as the present invention. This vertical float switch utilizes a sensor head having a pivotally mounted permanent magnet which cooperates with a float in the sensed environment to operate a switch, such as a mercury switch or a microswitch, carried by the magnet bracket. The output of the switch is connected to an external utilization device such a a liquid supply valve and to an external alarm which indicates that the liquid level has reached a given critical level. These devices have the disadvantage in that the electrical connection is established across the switch contacts in the sensor head which is adjacent to the sensed environment and accordingly the device cannot readily be adapted for use in a hazardous environment such as a vessel containing an explosive fuel.

These and other disadvantages are overcome by the present invention wherein there is provided a fiber optics level or flow sensor system which is particularly adapted for use in hazardous environments, process control, and industrial and environmental control applications. The sensor head can be completely non-electrical and is connected to a remote control unit or module by means of at least one fiber optics cable and which is utilized to sense the position of a sensing element such as a float, displacement bob or mechanical vane.

SUMMARY OF THE INVENTION

Briefly, a fiber optics sensor system for use with a remote sensing device which interrupts a light path between the ends of a fiber optic cable is provided. First means are provided for generating pulsating input signals and second means are provided for generating light in response to the input signals and having an output optically coupled to one end of the cable. Means are coupled to the other end of the cable for detecting pulses of light and means are coupled to the detecting means for providing an output signal in response to the first means. Means are coupled to the output signal means for controlling an external utilization device.

BRIEF DESCRIPTION OF THE DRAWING

The advantages of this invention will become more readily appreciated as the same becomes completely understood by reference to the following detailed description when taken in conjunction with the accompanying drawing wherein.

DETAILED DESCRIPTION

Figure 1:
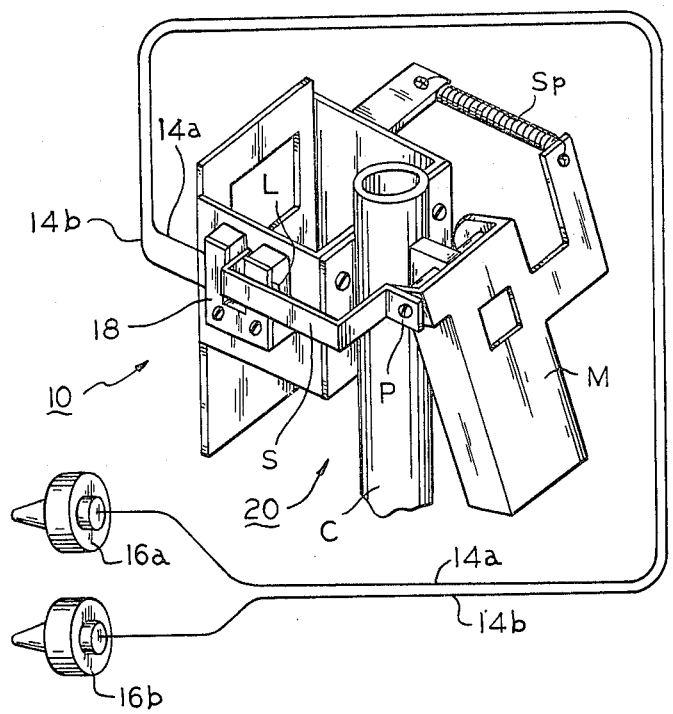
FIG. 1 is a pictorial view of a sensor head which is located in proximity to the sensed environment and which is adapted for use in the system in accordance with the present invention.
Figure 2:
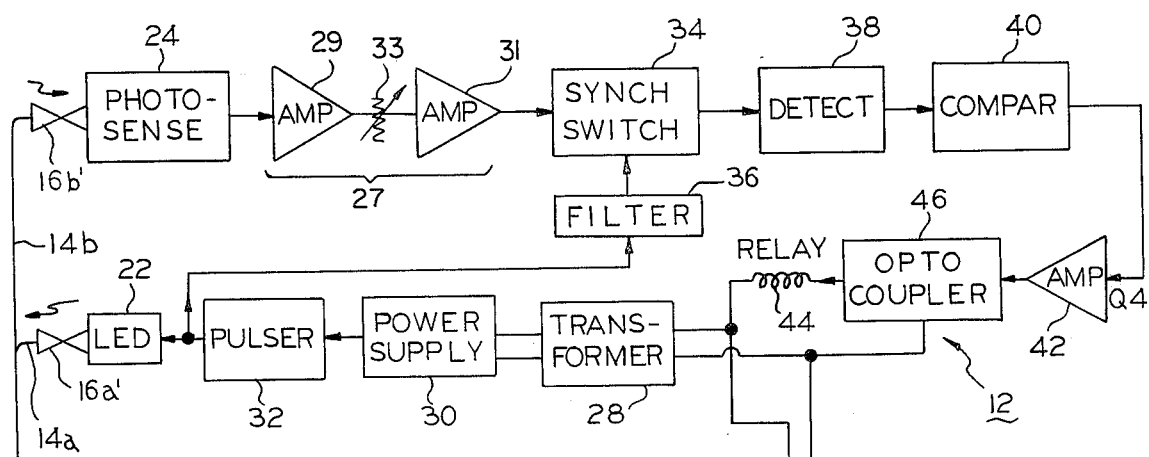
FIG. 2 is a combined schematic and functional diagram of the fiber optics sensor system in accordance with the principles of the present invention; and, FIG. 3 is a schematic diagram depicting preferred circuitry for use in the various blocks of the functional diagram of FIG. 2.
Figure 2:
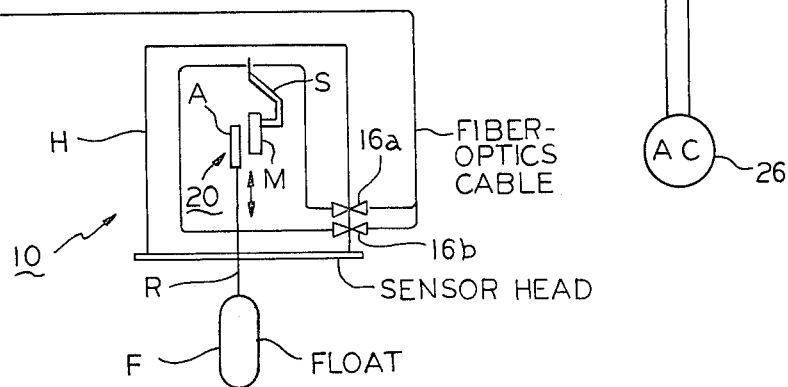

Referring now to FIG. 1 there is shown generally at 10 a suitable sensor head device for use with system 12 as depicted in FIG. 2. Sensor head device 10 of FIG. 1 includes a pair of fiber optic cables 14a and 14b which respectively terminate in standoff insulators and cable connectors 16a and 16b. At the sensor head end, cables 14a and 14b are terminated in a light gap fixture 18 of sensor 20. The details of sensor 20 are described in detail in the aforementioned U.S. Pat. No. 4,066,858 and so much of the disclosure of that patent is incorporated by reference herein as is necessary for a complete understanding of the operation of sensor 20. Briefly, however, sensor 20 includes a magnet M which is pivotally mounted about an axis P and which is biased away from cylinder C by means of spring $S_p$. A shutter member S is fixedly mounted to the bracket which holds magnet M and is thus also pivotally mounted about pivot point P. Cylinder C comprises a non-magnetic material, such as stainless steel, and includes an magnetic armature A slidably mounted therein. As best illustrated in FIG. 2, the armature A is connected to a float F in the sensed environment by means of a rod R. As the liquid level in the sensed environment varies, the position of the armature correspondingly varies within cylinder C so as to translate magnet M toward and away from cylinder C. For example, as the liquid level rises, the float and rod assembly translate armature A upwardly into proximity with magnet M until the force of spring $S_p$ is overcome and magnet M is translated toward cylinder C and shutter S is therefore correspondingly translated outwardly of the gap within U-shaped gap fixture 18. Fiber optic cables 14a and 14b are coupled through one leg of U-shaped gap 18 and one of the fiber optics cables is looped through the gap and around the other leg of fixture 18 at L so as to provide a continuous light path between the ends of cables 14a and 14b until such time as shutter S is translated downwardly to interrupt the light path in the gap between the legs of U-shaped fixture 18. The standoff insulator portions of connectors 16a and 16b serve to reduce the temperature of the fiber optic connector portions relative to the housing of sensor 20.

Referring now to FIG. 2 there is shown a combined block and functional diagram of the fiber optics level and flow sensor system in accordance with the present invention. System 12 includes a light generating device such as an LED (light emitting diode) 22 which irradiates the single fiber or fiber bundle of fiber optics cable 14a. A photodetector such as a photodetector 24 is optically coupled to fiber optics cable 14b by means of a suitable fiber optics connector 16b'. Power for system 12 is derived from a local AC power source 26 which is reduced stepped down through a transformer 28. The output of transformer 28 is coupled to a power supply 30 for providing a filtered, low-voltage source of DC operating potential at its output. The output of power supply 30 provides operating potential for the various system stages including a pulser or oscillator stage 32. The output of oscillator 32 drives LED 22 at a non-critical repetition rate such as, for example, 400 Hz. The pulse width of each of the pulses generated during the 400 cycle pulse repetition rate periods is preferably substantially less than the pulse repetition rate and can be an on pulse on the order of 200 microseconds. This combination of pulse repetition rate and pulse width is preferred in that it is compatible with inexpensive transistor devices including relatively slow phototransistor devices. The output of LED 22 is coupled through connector 16a' and looped through the sensor head as previously described. When the light path in fixture 18 of sensor 20 is not interrupting the light path therein, the pulsed light transmitted through the fiber optic cables illuminates phototransistor 24 which is coupled to connector 16b'. Phototransistor 24 provides an electrical signal indicative of and corresponding to the repetition rate and pulse width of the pulsed light signals which illuminate phototransistor 24. The output of phototransistor 24 is coupled to an amplification stage comprising amplifiers 29 and 31 having a gain control 33 disposed therebetween. The amplified output of amplifier stage 27 is applied as a first input to a synchronous switch 34. The output of oscillator 13 is also coupled as a second input to synchronous switch 34 by means of a filter 36. The output of synchronous switch 34 is thus time-discriminated or gated so as to provide an output only during the pulse width periods of the repetition rate period of the signals provided by oscillator 32. That is, switch 34 is operated synchronously with the output drive pulses of LED 22. Filter 36 functions to slightly delay the signals which are sampled at and derived from the output of oscillator 23 so as to compensate for any translation or transmission delays introduced by phototransistor 24. The output of synchronous switch 34 is then applied as an input to detector stage 38 which may comprise a simple tachometer or frequency-detector stage such as staircase generator. The output signal of detector stage 38 is therefore a filtered DC level which is proportional to the envelope and duration of the input signal. The output of detector stage 38 is coupled to a comparator 40 which compares the output of stage 38 to a fixed point of reference potential $V_R$. When the level of the output signal of stage 38 exceeds the predetermined reference level, the output of comparator 40 changes state and activates a relay driver or output stage 42. In a preferred embodiment of the present invention, the output of output stage 42 is coupled to a control relay 44 by way of an isolation stage or optical coupler 46. The optical coupler or optocoupler is utilized to provide isolation of system 12 from the AC power input lines which are applied to the coil of relay 44. The switch contacts of relay 44 (not shown) are coupled to an external utilization device such as an alarm or a liquid input valve.

Figure 3:
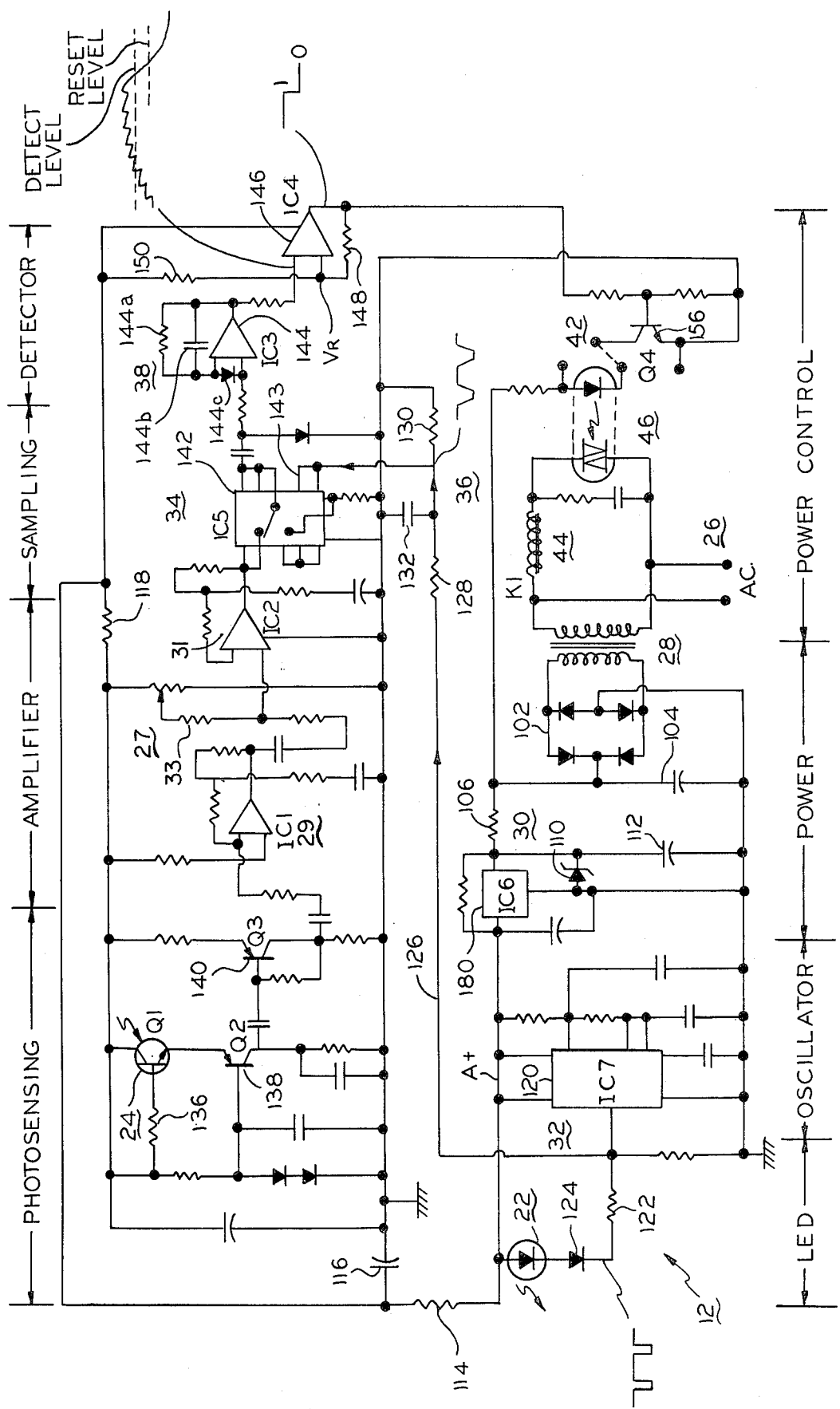

Referring now to FIG. 3 there is shown an schematic diagram of preferred circuitry for use in the various stages of system 12 as depicted in FIG. 2. The AC power source 26 is coupled to transformer 28 the secondary winding of which is connected to a conventional full-wave bridge rectifier 102. The output of rectifier 102 is filtered by filter capacitor 104 and the filtered DC output of rectifier 102 is coupled through a resistor 106 to a series voltage regulator 108 which may take the form of a conventional IC regulator known in the art as the 78L15 integrated circuit. A Zener diode 110 and a filter capacitor 112 provide a source of reference potential with respect to ground potential for series regulator 108. The regulated output A+ of series regulator 108 is coupled through the decoupling network comprising resistor 114 and filter capacitor 116. Decoupled DC operating potential is further applied to the low level stages of system 12 by means of a dropping resistor 118 as will be described more fully hereinafter. In one constructed embodiment, however, the output of series regulator 108 was on the order of 15 volts whereas the voltage drop across dropping resistor was on the order of 12 volts thus providing a 3 volt operating potential for the low level stages.

LED 22 is pulse-driven to peak currents on the order 100 milliamperes by the conventional oscillator circuit 120 which may take the form of a NE555 timer integrated circuit. The pulsed output of oscillator 120 is coupled to LED 22 by way of a resistor 122 and a diode 124. The output of oscillator circuit 120 is further coupled along lead 126 through filter network 36 comprising resistors 128 and 130 and capacitor 132 which, as previously described, functions to delay the output signals of oscillator circuit 120 to compensate for the delays introduced by phototransistor 24.

Phototransistor 24 is preferably a high gain, low cost phototransistor such as a Fairchild FPT520A. As previously alluded to, phototransistor 24 is operated at a very low supply voltage or operating potential to provide a low-noise output from transistor 24. A high value resistor 136 is provided in the base electrode path of transistor 24 so as to place the operating or "Q" point of device 24 into a higher and more linear region of its characteristic curves. In one constructed embodiment resistor 32 was on the order of 10 M ohms. The output of phototransistor 24 is amplified by a common-base configuration transistor 138(Q2) and a second low-gain common-emitter (CE) transistor stage 140(Q3). Devices Q1, Q2 and Q3 therefore cooperate so that the output of phototransistor 24 is constrained within a small voltage swing therefore to minimize the effect of base-collector capacitance on the frequency response of phototransistor 24. The output at the collector of transistor 140(Q3) is then amplified by amplifiers 29 and 31 of amplification stage 26. Amplifiers 29 and 31 may take the form of the National Semiconductors Corporation LM 3900 device which is a "Norton"-type operational amplifier integrated circuit. The associated components of operational amplifiers 29 and 31 are selected in accordance with the manufacturers recommended specifications to provide both high input impedance and high stage gain as set forth in publication entitled "Linear Applications Handbook 1" 1973, National Semiconductor Corporation, at Page AN72-7 therein. It should be further noted that since the input stages to this point are resistance capacitance coupled, such coupling functions to filter and discriminate against low frequency noise signals.

The output of operational amplifier 31 is then coupled to synchronous switching stage 42 which may take the form of an RCA CD4007 switching integrated circuit. The output of synchronous switch stage 142 is synchronized with and gated by the output of oscillator circuit 120 at input 143 of stage 142. Thus, as previously described, synchronous switch 142 serves to attenuate noise signals which fall outside of the desired window corresponding to the pulse width periods of the output signals of LED 22, thereby substantially reducing the average noise levels at the output signals of synchronous switch 142. The output of synchronous switch 142 is applied as an input to a staircase generator 144 comprising an operational amplifier having a feedback network comprising resistor 144a capacitor 144b and a diode 144c. The feedback network provides a staircase generator function at the output of detector 144. Thus, the output of stage 144 is essentially a filtered, DC level proportional to the envelope duration of the input signal provided to the input of detector 144. The output of detector 144 is coupled as a first input to comparator 146, the second input of which is coupled between fixed resistors 148 and 150 which thereby provide at the second input of comparator 146 a point of fixed reference potential with respect to ground potential. When the relative voltage difference between the two inputs of comparator 146 changes sign, the output of comparator 146 changes state to provide an indication of the status of the light gap at the associated sensor head 20—i.e that it is or is not interrupted by the shutter.

The output of comparator 146 is coupled to a relay driver transistor 156(Q4) the output of which is then coupled as an input to optocoupler 46 which may take the form of a Motorola MOC 3010 optocoupler. The output leads of optocoupler 46 are internally connected to Triac device which thereby applies both the positive and negative cycles of the AC input source across the coil of relay 44. The control contacts of relay 44 (not shown) are coupled to an external utilization device (not shown).

What has been taught, then, is a fiber optic sensor system for use with a remote sensing device which interrupts a light path between the ends of a fiber optic cable and facilitating, notably, applications in hazardous environments. The form of the invention illustrated herein is but a preferred embodiment of these teachings and in the form currently preferred for manufacture. It is shown as an illustration of the inventive concepts rather than by way of limitation, and it is pointed out that various modifications and alterations may be indulged in within the scope of the appended claims.

What is claimed is:

1. A fiber optics sensor system for use with a remote sensor device which interrupts a light path between the ends of a fiber optic cable, said system comprising, in combination:

first means for generating pulsating input signals;
    second means for generating light in response to said input signals and said second means having an output optically coupled to one end of said cable;
    means coupled to the other end of said cable for detecting pulses of light;
    means coupled to the detecting means for providing an output signal in response to said first means;
    means coupled to the output signal means for controlling an external utilization device;
    means responsive to said first means for selectively detecting said pulsating input signals during a time period which is synchronized with the duration of said pulsating input signals; and,
    wherein the pulse time width of said pulsating input signals is substantially less than the repetition rate of said pulsating input signals.

2. The system according to claim 1, wherein said second means comprises a light emitting diode coupled between said first means and a fixed point of potential with respect to a point of reference potential; and wherein said detecting means comprises a phototransistor coupled between said fixed point of potential and said output signal means.

3. The system according to claim 1, wherein said sensor device interrupts a light path gap between the confronting ends of an intermediate portion of said cable.

* * * * *